United States Patent
Tsai et al.

(10) Patent No.: US 12,426,044 B2
(45) Date of Patent: Sep. 23, 2025

(54) METHOD AND USER EQUIPMENT FOR HYBRID AUTOMATIC REPEAT REQUEST FEEDBACK OPERATION

(71) Applicant: SHARP KABUSHIKI KAISHA, Sakai (JP)

(72) Inventors: Hsin-Hsi Tsai, Taipei (TW); Chien-Chun Cheng, Taipei (TW)

(73) Assignee: SHARP KABUSHIKI KAISHA, Sakai (JP)

(*) Notice: Subject to any disclaimer, the term of this patent is extended or adjusted under 35 U.S.C. 154(b) by 332 days.

(21) Appl. No.: 17/704,726

(22) Filed: Mar. 25, 2022

(65) Prior Publication Data

US 2022/0322398 A1   Oct. 6, 2022

Related U.S. Application Data

(60) Provisional application No. 63/166,936, filed on Mar. 26, 2021.

(51) Int. Cl.
*H04W 72/00* (2023.01)
*H04L 1/1812* (2023.01)
(Continued)

(52) U.S. Cl.
CPC ....... *H04W 72/1273* (2013.01); *H04L 1/1812* (2013.01); *H04W 72/23* (2023.01)

(58) Field of Classification Search
CPC .............. H04W 72/1273; H04W 72/23; H04L 1/1812; H04L 1/08; H04L 1/1845;
(Continued)

(56) References Cited

U.S. PATENT DOCUMENTS

2021/0029706 A1 * 1/2021 Zhou .................... H04L 1/1854
2021/0037406 A1   2/2021 Takeda et al.
(Continued)

FOREIGN PATENT DOCUMENTS

| CN | 110149173 A | 8/2019 |
|----|-------------|--------|
| CN | 111971994 A | 11/2020 |
| WO | 2021024121 A1 | 2/2021 |

OTHER PUBLICATIONS

Sony, "Enhancements on delay-tolerant HARQ", R1-2005575,3GPP TSG RAN WG1 Meeting #102-e, E-meeting, Aug. 17-28, 2020, the whole document.
(Continued)

*Primary Examiner* — Brandon M Renner
(74) *Attorney, Agent, or Firm* — ScienBiziP, P.C.

(57) ABSTRACT

A method and a user equipment for performing a Hybrid Automatic Repeat Request (HARQ) feedback operation are provided. The method includes: receiving, from a Base Station (BS), a first configuration indicating whether HARQ feedback for a HARQ process is enabled or disabled; receiving, from the BS, Downlink Control Information (DCI) on a Physical Downlink Control Channel (PDCCH), the DCI indicating (i) activation or deactivation of semi-persistent scheduling (SPS) and (ii) a Physical Downlink Shared Channel (PDSCH) reception for the HARQ process; and determining, based on a second configuration, and regardless of the HARQ feedback for the HARQ process is enabled or disabled, whether to transmit the HARQ feedback to the BS in response to the PDSCH reception in a case that the second configuration is received from the BS and the DCI indicates the activation of the SPS.

12 Claims, 4 Drawing Sheets

(51) Int. Cl.
*H04W 72/1273* (2023.01)
*H04W 72/23* (2023.01)

(58) Field of Classification Search
CPC ... H04L 1/1854; H04L 1/1861; H04L 1/1896; H04L 5/0053; H04L 5/0055; H04L 1/1822
See application file for complete search history.

(56) References Cited

U.S. PATENT DOCUMENTS

| | | | |
|---|---|---|---|
| 2022/0052779 A1* | 2/2022 | Ye | H04L 5/0048 |
| 2022/0287011 A1* | 9/2022 | Liu | H04L 1/1825 |
| 2023/0180217 A1* | 6/2023 | Rossbach | H04W 72/23 370/329 |
| 2023/0188268 A1* | 6/2023 | Yan | H04L 1/1896 370/329 |

OTHER PUBLICATIONS

Moderator (ZTE), "Summary of AI 8.4.3 for HARQ for NTN", R1-2101903, 3GPP TSG RAN WG1 #104e, e-Meeting, Jan. 25-Feb. 5, 2021, the whole document.
3GPP TS 38.321, "3rd Generation Partnership Project; Technical Specification Group Radio Access Network; NR; Medium Access Control (MAC) protocol specification (Release 16)", V16.3.0 (Dec. 2020).
3GPP TS 38.214, "3rd Generation Partnership Project; Technical Specification Group Radio Access Network; NR; Physical layer procedures for data (Release 16)", V16.4.0 (Dec. 2020).
3GPP TS 38.322, "3rd Generation Partnership Project; Technical Specification Group Radio Access Network; NR; Radio Link Control (RLC) protocol specification (Release 16)", V16.2.0 (Dec. 2020).
3GPP TS 38.323, "3rd Generation Partnership Project; Technical Specification Group Radio Access Network; NR; Packet Data Convergence Protocol (PDCP) specification (Release 16)", V16.2.0 (Sep. 2020).
3GPP TS 37.213, "3rd Generation Partnership Project; Technical Specification Group Radio Access Network; Physical ayer procedures for shared spectrum channel access (Release 16)", V16.4.0 (Dec. 2020).
3GPP TS 38.212, "3rd Generation Partnership Project; Technical Specification Group Radio Access Network; NR; Multiplexing and channel coding (Release 16)", V16.3.0 (Sep. 2020).
3GPP TS 38.213, "3rd Generation Partnership Project; Technical Specification Group Radio Access Network; NR; Physical layer procedures for control (Release 16)", V16.4.0 (Dec. 2020).
3GPP TS 38.300, "3rd Generation Partnership Project; Technical Specification Group Radio Access Network; NR; NR and NG-RAN Overall Description; Stage 2 (Release 16)", V16.4.0 (Dec. 2020).
3GPP TS 38.331, "3rd Generation Partnership Project; Technical Specification Group Radio Access Network; NR; Radio Resource Control (RRC) protocol specification (Release 16)", V16.3.1 (Jan. 2021).
3GPP TR 38.821, "3rd Generation Partnership Project; Technical Specification Group Radio Access Network; Solutions for NR to support non-terrestrial networks (NTN) (Release 16)", V16.0.0 ( Dec. 2019).
SONY: "Enhancements on HARQ for NTN", 3GPP Draft; R1-2100861, 3GPP TSG RAN WG1 Meeting #104-e, E-meeting, Jan. 25-Feb. 5, 2021 (Jan. 19, 2021).
Moderator (ZTE): "Summary#4 of AI 8.4.3 for HARQ for NTN", 3GPP Draft; R1-2102143, 3GPP TSG RAN WG1 #104e, e-Meeting, Jan. 25-Feb. 5, 2021 (Feb. 5, 2021).

* cited by examiner

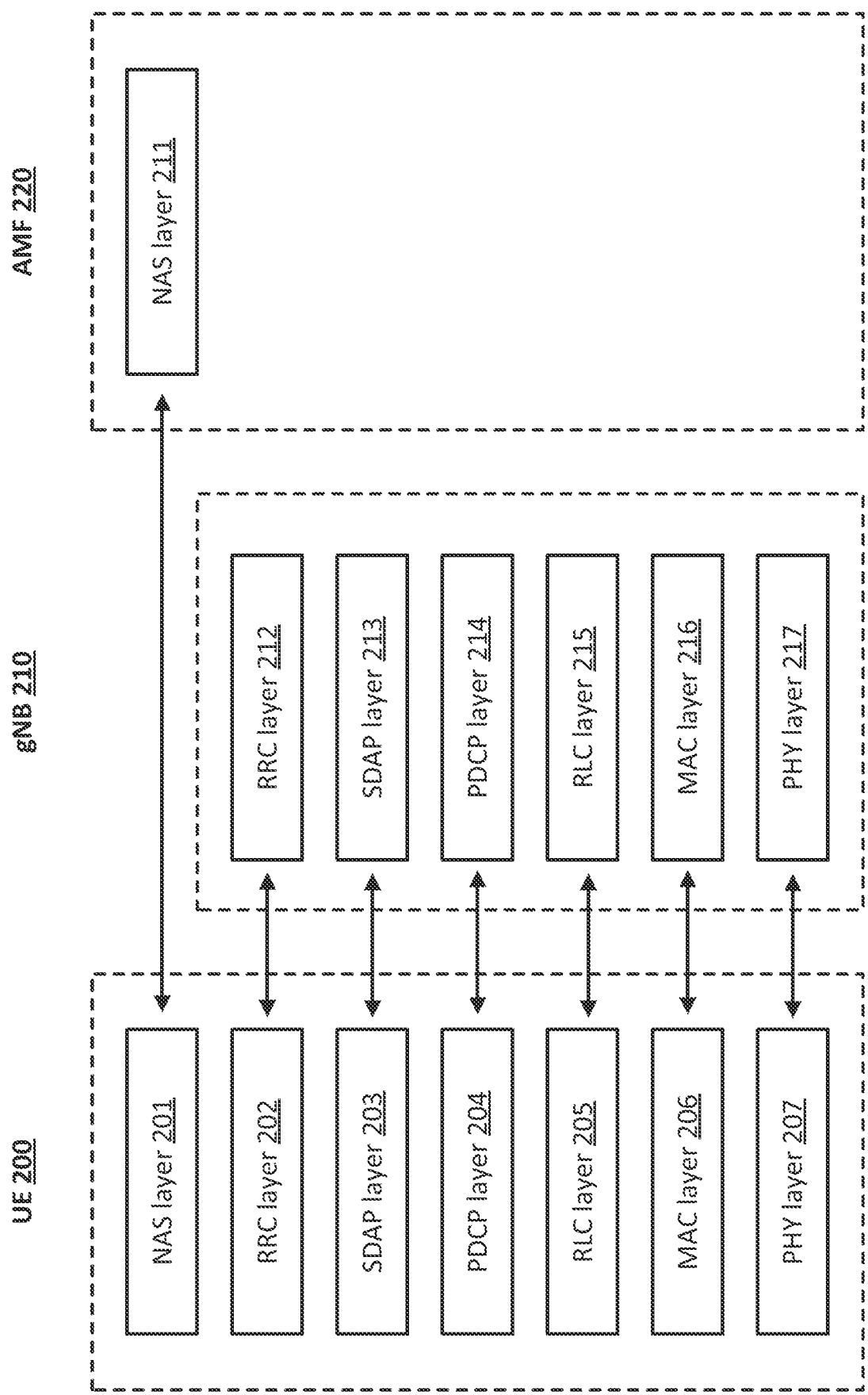

300

302 — Receive, from a Base Station (BS), a first configuration indicating whether HARQ feedback for a HARQ process is enabled or disabled 304 — Receive, from the BS, Downlink Control Information (DCI) on a Physical Downlink Control Channel (PDCCH), the DCI indicating (i) activation or deactivation of semi-persistent scheduling (SPS) and (ii) a Physical Downlink Shared Channel (PDSCH) reception for the HARQ process 306 — Determine, based on a second configuration, and regardless of the HARQ feedback for the HARQ process is enabled or disabled, whether to transmit the HARQ feedback to the BS in response to the PDSCH reception in a case that the second configuration is received from the BS and the DCI indicates the activation of the SPS

FIG. 3

METHOD AND USER EQUIPMENT FOR HYBRID AUTOMATIC REPEAT REQUEST FEEDBACK OPERATION

CROSS-REFERENCE TO RELATED APPLICATION(S)

The present disclosure claims the benefit of and priority to U.S. Provisional Patent Application Ser. No. 63/166,936, filed on Mar. 26, 2021, entitled "HARQ FEEDBACK HANDLING IN NTN." The content of which is hereby incorporated fully by reference into the present disclosure for all purposes.

FIELD

The present disclosure is related to wireless communication, and more particularly, to a method and a user equipment (UE) for performing a hybrid automatic repeat request (HARQ) feedback operation in the next generation wireless communication networks.

BACKGROUND

Various efforts have been made to improve different aspects of wireless communication for cellular wireless communication systems, such as 5G New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC). However, as the demand for radio access continues to increase, there exists a need for further improvements in the art.

SUMMARY

The present disclosure is related to a method and a user equipment for performing a hybrid automatic repeat request (HARQ) feedback operation in the next generation wireless communication networks.

In a first aspect of the present disclosure, a method for a user equipment (UE) to perform a HARQ feedback operation is provided. The method includes: receiving, from a Base Station (BS), a first configuration indicating whether HARQ feedback for a HARQ process is enabled or disabled; receiving, from the BS, Downlink Control Information (DCI) on a Physical Downlink Control Channel (PDCCH), the DCI indicating (i) activation or deactivation of semi-persistent scheduling (SPS) and (ii) a Physical Downlink Shared Channel (PDSCH) reception for the HARQ process; and determining, based on a second configuration, and regardless of the HARQ feedback for the HARQ process is enabled or disabled, whether to transmit the HARQ feedback to the BS in response to the PDSCH reception in a case that the second configuration is received from the BS and the DCI indicates the activation of the SPS.

In an implementation of the first aspect of the present disclosure, the second configuration indicates whether the HARQ feedback for the activation of the SPS is enabled In an implementation of the first aspect of the present disclosure, the method further includes: transmitting the HARQ feedback to the BS in response to the PDSCH reception in a case that the second configuration indicates that the HARQ feedback for the activation of the SPS is enabled.

In an implementation of the first aspect of the present disclosure, the method further includes: determining, based on the first configuration, whether to transmit the HARQ feedback to the BS in response to the PDSCH reception in a case that the second configuration received from the BS indicates that the HARQ feedback for the activation of the SPS is not enabled and the DCI indicates the activation of the SPS.

In an implementation of the first aspect of the present disclosure, the method further includes: transmitting the HARQ feedback to the BS in response to the PDSCH reception in a case that the first configuration indicates that the HARQ feedback for the HARQ process is enabled.

In an implementation of the first aspect of the present disclosure, the method further includes: determining, based on the first configuration, whether to transmit the HARQ feedback to the BS in response to the PDSCH reception in a case that the second configuration is not received from the BS and the DCI indicates the activation of the SPS.

In an implementation of the first aspect of the present disclosure, the method further includes: transmitting the HARQ feedback to the BS in response to the PDSCH reception in a case that the first configuration indicates that the HARQ feedback for the HARQ process is enabled.

In an implementation of the first aspect of the present disclosure, the first configuration is included in a PDSCH-ServingCellConfig Information Element (IE) received from the BS.

In an implementation of the first aspect of the present disclosure, the second configuration is included in a Medium Access Control (MAC)-CellGroupConfig Information Element (IE) received from the BS.

In an implementation of the first aspect of the present disclosure, the method further includes: transmitting, regardless of the HARQ feedback is enabled or disabled, the HARQ feedback to the BS in response to the PDSCH reception in a case that the DCI indicates the deactivation of the SPS.

In a second aspect of the present disclosure, a UE for performing a HARQ feedback operation is provided. The UE includes one or more non-transitory computer-readable media having computer-executable instructions embodied thereon; and at least one processor coupled to the one or more non-transitory computer-readable media. The at least one processor is configured to execute the computer-executable instructions to: receive, from a Base Station (B S), a first configuration indicating whether HARQ feedback for a HARQ process is enabled or disabled; receive, from the BS, Downlink Control Information (DCI) on a Physical Downlink Control Channel (PDCCH), the DCI indicating (i) activation or deactivation of semi-persistent scheduling (SPS) and (ii) a Physical Downlink Shared Channel (PDSCH) reception for the HARQ process; and determine, based on a second configuration, and regardless of the HARQ feedback for the HARQ process is enabled or disabled, whether to transmit the HARQ feedback to the BS in response to the PDSCH reception in a case that the second configuration is received from the BS and the DCI indicates the activation of the SPS.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

FIG. 2 is a schematic diagram illustrating a radio protocol stack, according to an example implementation of the present disclosure.

FIG. 3 is a flowchart illustrating a method/process for a UE to perform a hybrid automatic repeat request (HARQ) feedback operation, according to an example implementation of the present disclosure.

DESCRIPTION

Figure 1:
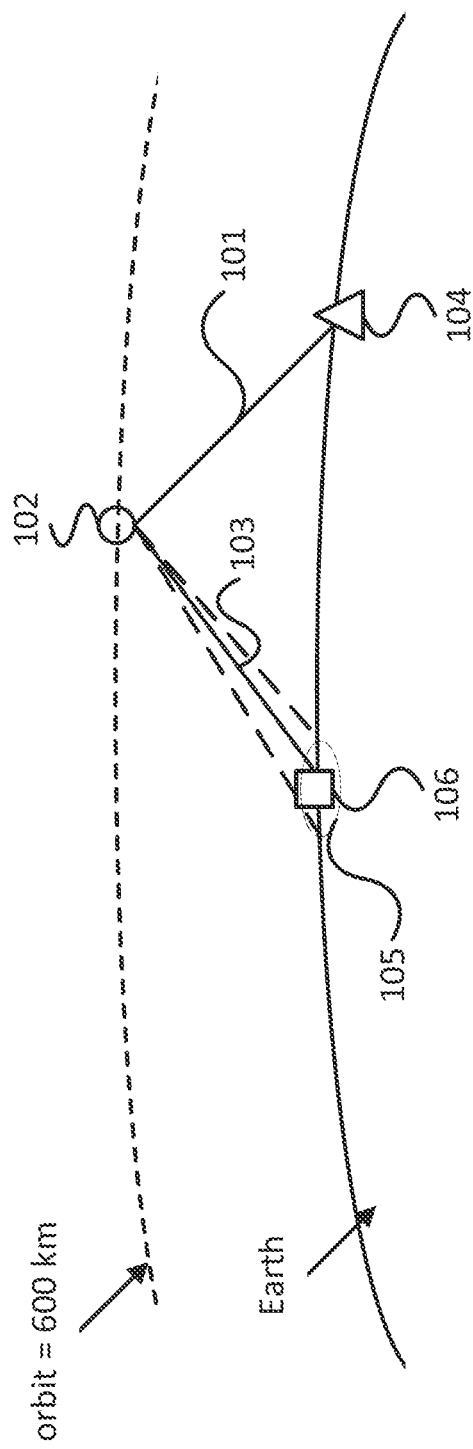
FIG. 1 is a schematic diagram illustrating a Low Earth Orbit (LEO) satellite with transparent-payload deployment, according to an example implementation of the present disclosure.

The acronyms in the present application are defined as follows and unless otherwise specified, the acronyms have the following meanings:

| Acronym | Full name |
| --- | --- |
| 3GPP | $3^{rd}$ Generation Partnership Project |
| 5GC | 5G Core |
| ACK | Acknowledgement |
| ASIC | Application Specific Integrated Circuitry |
| BDS | Beidou Navigation Satellite System |
| BLER | Block Error Rate |
| BS | Base Station |
| BSC | BS Controller |
| BWP | Bandwidth Part |
| CBRA | Contention-Based Random Access |
| CCCH | Common Control Channel |
| CD-ROM | Compact Disc Read-Only Memory |
| CE | Control Element |
| CFRA | Contention Free Random Access |
| CG | Configured Grant |
| CN | Core Network |
| CP | Cyclic Prefix |
| CRC | Cyclic Redundancy Check |
| GRID | Contention Resolution Identity |
| C-RNTI | Cell-Radio Network Temporary Identifier |
| CS-RNTI | Configured Scheduling-RNTI |
| dB | Decibel |
| DC | Dual Connectivity |
| DCI | Downlink Control Information |
| DFI | Downlink Feedback Information |
| DL | Downlink |
| DL-SCH | Downlink-Shared Channel |
| DMRS | Demodulation Reference Signal |
| DRX | Discontinuous Reception |
| DSP | Digital Signal Processor |
| e-LTE | evolved LTE |
| E-UTRA | Evolved Universal Terrestrial Radio Access |
| E-UTRAN | Evolved Universal Terrestrial Radio Access Network |
| EDGE | Enhanced Data rates for GSM Evolution |
| EEPROM | Electrically Erasable Programmable Read-Only Memory |
| eMBB | enhanced Mobile Broadband |
| eMTC | massive Machine-Type Communication |
| EPC | Evolved Packet Core |
| EPROM | Erasable Programmable Read-Only Memory |
| GEO | Geostationary Earth Orbit |
| GERAN | EDGE RAN |
| GLONASS | Global Navigation Satellite System |
| gNB | Next Generation Node B |
| GNSS | Global Navigation Satellite System |
| GPRS | General Packet Radio Service |
| GPS | Global Positioning System |
| GSM | Global System for Mobile communication |
| HAPS | High Altitude Platform Station |
| HARQ | Hybrid Automatic Repeat request |
| HSPA | High-Speed Packet Access |
| ID | Identifier |
| IE | Information Elements |
| LCH | Logical Channel |
| LDPC | Low-Density Parity-Check |
| LEO | Low Earth Orbit |
| LTE | Long-Term Evolution |
| LTE-A | LTE-Advanced |
| MAC | Medium Access Control |
| MCG | Master Cell Group |
| MEO | Medium Earth Orbit |
| Msg | Message |
| NACK | Non-Acknowledgement |
| NAS | Non-Access Stratum |
| NDI | New Data Indicator |
| NGEO | Non-Geostationary Earth Orbit |
| NR | New Radio |
| NTN | Non-Terrestrial Network |
| NW | Network |
| OFDM | Orthogonal Frequency-Division Multiplexing |
| PCell | Primacy Cell |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical |
| PRACH | Physical Random Access Channel |
| PRB | Physical Resource Block |
| PRU | PUSCH Resource Unit |
| PSCell | Primary SCG Cell |
| PUCCH | Physical Uplink Control Channel |
| PUSCH | Physical Uplink Shared Channel |
| PO | PUSCH Occasion |
| QoS | Quality of Service |
| RA | Random Access |
| RACH | Random Access Channel |
| RAM | Random Access Memory |
| RAN | Radio Access Network |
| RAR | Random Access Response |
| RAT | Radio Access Technology |
| Rel | Release |
| RLC | Radio Link Control |
| RNC | Radio Network Controller |
| RNTI | Radio Network Temporary Identifier |
| RO | PRACH Occasion |
| ROM | Read Only Memory |
| RRC | Radio Resource Control |
| ProSe | Proximity Service |
| RTT | Round Trip Time |
| RV | Redundancy Version |
| Scell | Secondary Cell |
| SCG | Secondary Cell Group |
| SDAP | Service Data Adaptation Protocol |
| SDU | Service Data Unit |
| SI | System Information |
| SL | Sidelink |
| SL-SCH | Sidelink-Shared Channel |
| SN | Sequence Number |
| SpCell | Special Cell |
| SPS | Semi-Persistent Scheduling |
| SRS | Sounding Reference Signal |
| TA | Timing Advance |
| TAG | Timing Advance Group |
| TB | Transport Block |
| TBS | Transport Block Size |
| TC-RNTI | Temporary C-RNTI |
| TPC | Transmit Power Control |
| TS | Technical Specification |
| Tx | Transmission |
| TRP | Transmission and Reception Point |
| UE | User Equipment |
| UL | Uplink |
| UL-SCH | Uplink-Shared Channel |
| UMTS | Universal Mobile Telecommunications System |
| URLLC | Ultra-Reliable and Low-Latency Communication |
| V2X | Vehicle to Everything |

-continued

| Acronym | Full name |
|---|---|
| W-CDMA | Wideband-Code Division Multiple Access |
| WiMAX | Microwave Access |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art. Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purposes of consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the so-disclosed combination, group, series or equivalent. The expression "at least one of A, B and C" or "at least one of the following: A, B and C" means "only A, or only B, or only C, or any combination of A, B and C."

For the purposes of explanation and non-limitation, specific details such as functional entities, techniques, protocols, and standards are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof. A software implementation may include computer executable instructions stored on a computer readable medium such as memory or other type of storage devices. One or more microprocessors or general-purpose computers with communication processing capability may be programmed with corresponding executable instructions and perform the disclosed network function(s) or algorithm(s). The microprocessors or general-purpose computers may include Application Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure.

The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more B Ss.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

A BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage. Each cell (often referred to as a serving cell) may provide services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used. Additionally, two coding schemes are considered for NR, specifically Low-Density Parity-Check (LDPC) code and Polar Code. The coding scheme adaption may be configured based on channel conditions and/or service applications.

Moreover, it is also considered that in a transmission time interval TX of a single NR frame, downlink (DL) transmission data, a guard period, and uplink (UL) transmission data should at least be included, where the respective portions of the DL transmission data, the guard period, and the UL transmission data should also be configurable, for example, based on the network dynamics of NR. In addition, sidelink resources may also be provided in an NR frame to support ProSe services.

In addition, the terms "system" and "network" herein may be used interchangeably. The term "and/or" herein is only an association relationship for describing associated objects and represents that these relationships may exist. For example, A and/or B may indicate that: A exists alone, A and B exist at the same time, or B exists alone. In addition, the character "/" herein generally represents that the former and latter associated objects are in an "or" relationship.

Examples of some selected terms are provided as follows.

User Equipment (UE): The UE may be referred to as a PHY/MAC/RLC/PDCP/SDAP/RRC entity/layer. Conversely, the PHY/MAC/RLC/PDCP/SDAP/RRC entity/layer may be referred to as the UE.

Network (NW): The NW may include a network node, a TRP, a cell (e.g., SpCell, PCell, PSCell, and/or SCell), an eNB, a gNB, and/or a base station.

Serving Cell: The serving cell may include a PCell, a PSCell, or a SCell. The serving cell may also include an activated or a deactivated serving cell.

Special Cell (SpCell): For DC operation, the SpCell may be referred to as the PCell of the MCG or the PSCell of the SCG depending on whether the MAC entity is associated with the MCG or the SCG. Otherwise, the SpCell may be referred to as the PCell.

Geostationary Earth Orbit (GEO): A circular geosynchronous orbit 35,786 kilometers above Earth's equator and following the direction of Earth's rotation.

High Altitude Platform Station (HAPS): The airborne vehicle embarking the NTN payload placed at an altitude between 8 and 50 kilometers.

Satellite: A space-borne vehicle embarking the NTN payload, placed into NGEO or GEO.

Service link: The wireless link between the NTN payload and the UE.

UE-gNB RTT: A UE with pre-compensation capability may obtain UE specific UE-gNB RTT based on its GNSS in LEO/GEO.

Dynamic scheduling: The gNB may dynamically allocate resources to UEs via the C-RNTI on the PDCCH.

UL grant: The UL grant may be either received dynamically on the PDCCH, in the RAR, configured semi-persistently by the RRC signaling or determined to be associated with the PUSCH resource of MsgA. The MAC entity may have an UL grant to transmit on the UL-SCH. To perform the requested transmissions, the MAC layer may receive the HARQ information from the lower layers.

Semi-Persistent Scheduling (SPS): The SPS may be configured by the RRC signaling for a serving cell per BWP. Multiple assignments may be active simultaneously in the same BWP. The activation and deactivation of the DL SPS may be independent among the serving cells. For the DL SPS, a DL assignment may be provided by the PDCCH, and stored or cleared based on L1 signaling indicating SPS activation or deactivation.

Configured Grant (CG): The gNB may allocate uplink resources for the initial HARQ transmissions and/or HARQ retransmissions to UEs. Two types of configured UL grants may be defined. With Type 1, the RRC signaling may directly provide the configured UL grant (e.g., including the periodicity). With Type 2, the RRC signaling may define the periodicity of the configured uplink grant while a PDCCH addressed to CS-RNTI may either signal and activate the configured UL grant, or deactivate it (e.g., a PDCCH addressed to CS-RNTI may indicate that the UL grant may be implicitly reused according to the periodicity defined by the RRC signaling, until deactivated).

Random Access Response (RAR) grant: The UL grant may be provided via Msg2/RAR and/or MsgB of the 4-step/2-step RA procedure. The UL grant may be included in the MAC payload for RAR and/or MsgB (e.g., MAC RAR and/or fallback RAR). The UL grant may be provided by an UL Grant field that indicates the resources to be used on the uplink in the 3GPP Technical Specification (TS) 38.213. The size of the UL Grant field may be 27 bits. The transmission for the RAR grant may be via Msg 3.

MsgA: The MsgA may consist of a PRACH preamble and a PUSCH transmission, known as MsgA PRACH and MsgA PUSCH, respectively.

MsgA PRACH: The MsgA PRACH preambles may be separate from the 4-step RACH preambles, but may be transmitted in the same ROs as the preambles of 4-step RACH, or in separate ROs.

MsgA PUSCH: The PUSCH transmissions may be organized into POs which may span multiple symbols and PRBs with optional guard periods and guard bands between consecutive POs. Each PO may consist of multiple DMRS ports and DMRS sequences, with each DMRS port/DMRS sequence pair known as PRU.

HARQ information: The HARQ information for DL-SCH, for UL-SCH, or for SL-SCH transmissions may include NDI, TBS, RV, and HARQ process ID.

RTT duration: The RTT duration may be the minimum duration before a UL HARQ retransmission grant and/or a DL assignment is expected by the UE/MAC entity. The RTT duration may be indicated by the timer drx-HARQ-RTT-TimerDL and/or the timer drx-HARQ-RTT-TimerUL. The RTT duration may be indicated by a specific offset. The RTT duration may be associated with a TA value.

The "UL data transmission" and/or "PUSCH transmission" may be referred to as the PUSCH configured by the CG, the PUSCH scheduled by the PDCCH, the Msg3, and/or the MsgA PUSCH. The terms "layer," "sublayer," and "entity" may be interchangeably used in some implementations of the present disclosure. The terms "disable HARQ," "disable HARQ process," "disable HARQ feedback," and "HARQ feedback is disabled" may be interchangeably used in some implementations of the present disclosure. The terms "assume," "determine," "expect," and "consider" may be interchangeably used in some implementations of the present disclosure. The terms "data," "TB," "(PHY/MAC/

RLC/PDCH/SDAP/RRC) PDU," "(PHY/MAC/RLC/PDCHISDAP/RRC) SDU," and "PDSCH transmission" may be interchangeably used in some implementations of the present disclosure. The terms "transmission" and "reception" may be interchangeably used in some implementations of the present disclosure. The terms "HARQ buffer" and "soft buffer" may be interchangeably used in some implementations of the present disclosure. The terms "deactivate" and "release" may be interchangeably used in some implementations of the present disclosure. The terms "SPS PDSCH release" and "SPS deactivation" may be interchangeably used in some implementations of the present disclosure. The terms "HARQ feedback," "positive acknowledgement," and "HARQ-ACK information" may be interchangeably used in some implementations of the present disclosure.

For DL, the HARQ feedback may be enabled/disabled, but the HARQ processes may remain configured. The criteria and decision to enable/disable the HARQ feedback may be under network control and may be signaled to the UE via the RRC signaling in a semi-static manner. The enabling/disabling of the HARQ feedback for downlink transmission may be at least configurable per HARQ process via the UE specific RRC signaling. For dynamic grant, one possibility for enabling/disabling the HARQ uplink retransmission at UE transmitter may be without introducing an additional mechanism (e.g., the gNB may send grant with NDI not toggled/toggled without waiting for decoding result of previous PUSCH transmission). For HARQ processes with disabled DL HARQ feedback, the timer drx-HARQ-RTT-TimerDL may not be started. From RAN2 perspective, for HARQ processes, the gNB may send UL grant without waiting for decoding result of previous PUSCH transmission, no new network scheduling restrictions may be introduced to schedule subsequent grants (e.g., up to network implementation). For HARQ processes with enabled DL HARQ feedback, the length of the timer drx-HARQ-RTT-TimerDL may be increased by an offset (e.g., existing values within value range increased by offset). For a DL HARQ process with disabled HARQ feedback, the UE may not receive another PDSCH or set of slot-aggregated PDSCH scheduled for the given HARQ process that starts until X after the end of the reception of the last PDSCH or slot-aggregated PDSCH for that HARQ process.

In NTN, the following three types (a)-(c) of service links may be supported. (a) Earth-fixed: provisioned by beam(s) continuously covering the same geographical areas all the time (e.g., the case of GEO satellites and HAPS). (b) Quasi-Earth-fixed: provisioned by beam(s) covering one geographical area for a finite period and a different geographical area during another period (e.g., the case of NGEO satellites generating steerable beams). (c) Earth-moving: provisioned by beam(s) the footprint of which slides over the Earth surface (e.g., the case of NGEO satellites generating fixed or non-steerable beams).

The NGEO may encompass circular orbits of constellation of satellites at altitude greater than or equal to 300 kilometers. This may include LEO at altitude approximately between 300 kilometers and 1500 kilometers and MEO at altitude between 1500 kilometers and 35786 kilometers. With NGEO satellites, the gNB may provide either quasi-Earth-fixed cells or Earth-moving cells, while the gNB operating with GEO satellite may provide Earth fixed cells.

The NTN may refer to networks, or segments of networks, using a spaceborne vehicle for transmission (e.g., using LEO satellites). In 3GPP NR Rel-17, a transparent payload-based LEO scenario may address at least 3GPP class 3 UEs with GNSS capability having the following (A) to (C) conditions. (A) the transparent payload-based LEO network may refer to a relay-based NTN. In this case, the LEO satellites may simply perform amplify-and-forward in space, and the base station/gNB may be located on the ground connected to the core NW. The orbit of 600 kilometers may be considered. (B) 3GPP class 3 UE may refer to Power Class UE 3. The definition may be used for the UL Tx power level set to be 23 dB with a range of plus and minus 2 dB. This setting is mainly driven to ensure backward compatibility with prior technologies (i.e., Rel-15 NR/GSM/UMTS), so that network deployment topologies may remain similar. (C) The GNSS may refer to the standard generic term for satellite navigation systems that provide autonomous geo-spatial positioning with global coverage. The GNSS may include, e.g., the GPS, the GLONASS, Galileo, BDS, and other regional systems. The GNSS may be operated on an orbit of 20200 kilometers.

FIG. 1 is a schematic diagram illustrating an LEO satellite (at 600 km distance from the earth) with transparent-payload deployment, according to an example implementation of the present disclosure.

The feeder link 101 may refer to a radio link between the LEO satellite 102 and the gNB 104. The service link 103 may refer to a radio link between the LEO satellite 102 and the UE 106. The satellite beam 105 may refer to a beam generated by an antenna onboard the LEO satellite 102. The diameter of the satellite beam 105 may be considered with a range from 50 to 1000 kilometers, making impacts on maximum differential delay among UEs in service.

FIG. 2 is a schematic diagram illustrating a radio protocol stack, according to an example implementation of the present disclosure.

The radio protocol stack may consist of several sublayers (e.g., NAS layer 201 of the UE 200, RRC layer 202 of the UE 200, SDAP layer 203 of the UE 200, PDCP layer 204 of the UE 200, RLC layer 205 of the UE 200, MAC layer 206 of the UE 200, PHY layer 207 of the UE 200, NAS layer 211 of the AMF 220, RRC layer 212 of the gNB 210, SDAP layer 213 of the gNB 210, PDCP layer 214 of the gNB 210, RLC layer 215 of the gNB 210, MAC layer 216 of the gNB 210, PHY layer 217 of the gNB 210). Different layers may be responsible for different functions. The functions may be separated, such that they may be related to the control plane or to the user plane. In the control plane, control-relevant information may be exchanged between the network/gNB 210 and the UE 200. The establishment and management of sessions may occur at the highest layer of the control plane called NAS. The next layer (e.g., RRC layer) may exchange control information with the device to set important parameters for the session. In the user plane, the network 210 and the UE 200 may exchange user data. The highest layers may be the application and IP layers and may refer to the worldwide web and other applications running on it. Data then may go through the SDAP layer, a new protocol layer for QoS management. The SDAP layer for QoS management in the user plane may provide mapping between the QoS flow and the data radio bearers and may provide marking for the QoS flow IDs in the downlink and uplink packets all the way to the 5G core. The IP header may be replaced with a 5G equivalent at the PDCP layer. The RLC layer may organize the data and perform retransmissions, if necessary. Prioritization and hybrid automated retransmission requests may take place at the MAC layer. The last layer in the protocol structure may be the PHY layer. This layer may involve aspects relevant to the communication channel between the user equipment and the core network, as well as other aspects like modulation and beamforming.

The data flows between the RLC, MAC, and PHY layers of the stack through different channels (e.g., logical, transport, and/or physical channels). The logical channels may be between the RLC and MAC layers. These channels may define the type of data that may be transferred. The transport channels may carry information from the MAC layer to the PHY layer. These channels may define how the information will be carried to the physical layer and also may define the characteristics of the data. The physical layer may communicate directly with the user equipment through the physical channels. The physical channel characteristics may include timing, access protocols, and data rates.

The MAC sublayer of the UE may support error correction and/or repetition through HARQ. The HARQ functionality may ensure delivery between peer entities at Layer 1 (e.g., physical layer). For NTN, the network may disable the uplink HARQ feedback for downlink transmission at the UE receiver, e.g., to cope with long propagation delays. Even if HARQ feedback is disabled, the HARQ processes may still be configured. The enabling/disabling of the HARQ feedback may be a network decision signaled semi-statically to the UE (e.g., through the RRC signaling). The enabling/disabling of the HARQ feedback for downlink transmissions may be configurable on a per UE, and/or per HARQ process, basis via the RRC signaling. For NTN, the network may disable the HARQ uplink retransmissions at the UE transmitter. Even if the HARQ uplink retransmissions are disabled, the HARQ processes may still be configured. The enabling/disabling of HARQ uplink retransmission may be configurable on a per UE, per HARQ process, and/or per LCH basis. The network criteria of enabling/disabling the HARQ feedback may not be specified. Examples for possible criteria may be latency or throughput service requirements, transmissions roundtrip time, etc. Other criteria may not be excluded. The SPS may be supported for HARQ processes with enabled and disabled HARQ feedback.

Multiple transmissions of the same TB in a bundle (e.g., the MAC layer may schedule packets in a bundle with pdsch-AggregationFactor>1 in the downlink and pusch-AggregationFactor>1 in the uplink) may be possible (e.g., as described in 3GPP NR Rel-15) and may be useful to lower the residual BLER, particularly in a case that the HARQ feedback is disabled. Soft combining of multiple transmissions (e.g., according to 3GPP NR Rel-15) may be supported in the receiver. Multiple transmissions of the same TB (e.g., the MAC layer may schedule the same TB on the same HARQ process without the NDI being toggled) may be possible and may also be useful to lower the residual BLER, particularly in a case that the HARQ feedback is disabled. Soft combining of multiple transmissions of the same TB by the MAC scheduler (e.g., the MAC layer may schedule the same TB on the same HARQ process without the NDI being toggled) may be supported (e.g., according to 3GPP NR Rel-15) in the receiver. If the feedback is disabled for a selective number (e.g., not all) of HARQ processes, the configuration parameters for different HARQ processes may need to be different.

In NR, with SPS, the gNB may allocate downlink resources for the initial HARQ transmissions to the UEs. The RRC configuration may define the periodicity of the configured downlink assignments, while the PDCCH addressed to CS-RNTI may either signal and activate the configured downlink assignment, or deactivate/release it (e.g., a PDCCH addressed to CS-RNTI may indicate that the downlink assignment may be implicitly reused, according to the periodicity defined by the RRC configuration, until deactivated/released). The SPS may be configured by RRC signaling for a serving cell per BWP. Multiple assignments may be active simultaneously in the same BWP. The activation and deactivation/release of the DL SPS may be independent among the serving cells.

The UE may be configured with up to 8 active configured downlink assignments for a given BWP of a serving cell. When more than one active configured downlink assignment is configured, the network may decide which of the configured downlink assignments are active at a time (including all of them). Each configured downlink assignment may then be activated separately using a DCI command. Deactivation of configured downlink assignments may be done using a DCI command, which may deactivate either a single configured downlink assignment or multiple configured downlink assignments jointly.

Furthermore, for the DL SPS, a DL assignment may be provided by the PDCCH, and may be stored or cleared based on L1 signaling (e.g., via DCI) indicating the SPS activation or deactivation/release. The RRC layer may configure the following parameters (A)-(D) when the SPS is configured. (A) cs-RNTI: for activation, deactivation, and retransmission. (B) nrofHARQ-Processes: the number of configured HARQ processes for SPS. (C) harq-ProcID-Offset: which is an offset of HARQ process for SPS. (D) periodicity: periodicity of configured downlink assignment for SPS. When the SPS is released by the upper layers (e.g., the RRC layer), all the corresponding configurations may be released.

In the following, HARQ feedback for SPS PDSCH release/SPS deactivation is described.

For a HARQ-ACK feedback mechanism, a UE may generate a positive acknowledgement (ACK) if the UE detects a DCI format that provides an SPS PDSCH release/SPS deactivation (and/or SPS activation). Based on the 3GPP TS 38.321, a DL assignment may be received on a PDCCH. The DL assignment may indicate a DL-SCH transmission and provide the HARQ information. When the UE/MAC entity monitors a PDCCH and receives a DL assignment for a PDCCH occasion on the PDCCH for the UE/MAC entity's CS-RNTI, the UE may determine the value of the NDI field in the received HARQ information. If the NDI in the received HARQ information is 0, the UE may further determine whether the PDCCH contents indicate the SPS deactivation/release. If the PDCCH contents indicate the SPS PDSCH release/SPS deactivation, and/or if the TA timer (e.g., associated with the TAG containing the serving cell on which the HARQ feedback is to be transmitted) is running, the UE/MAC entity may indicate a positive acknowledgement for the SPS PDSCH release/SPS deactivation to the PHY. Then the UE/PHY may provide HARQ-ACK information in response to an SPS PDSCH release/SPS deactivation after N symbols from the last symbol of a PDCCH that provides the SPS PDSCH release/SPS deactivation. Table 1 below includes an example of UE behavior when receiving a PDCCH that indicates the SPS deactivation/PDSCH release.

TABLE 1

TS 38.321 V16.3.0

Downlink assignments received on the PDCCH both indicate that there is a transmission on a DL-SCH for a
particular MAC entity and provide the relevant HARQ information.
When the MAC entity has a C-RNTI, Temporary C-RNTI, or CS-RNTI, the MAC entity shall for each
PDCCH
occasion during which it monitors PDCCH and for each Serving Cell:
   1> if a downlink assignment for this PDCCH occasion has been received on the
      PDCCH for the MAC entity's C-RNTI, or Temporary C-RNTI:
    2> [. . .]
   1> else if a downlink assignment for this PDCCH occasion has been received for this Serving Cell
      on the PDCCH for the MAC entity's CS-RNTI:
    2> if the NDI in the received HARQ information is 1: [. . .]
    2> if the NDI in the received HARQ information is 0:
      3> if PDCCH contents indicate SPS deactivation:
        4> clear the configured downlink assignment for this Serving Cell (if any);
        4> if the timeAlignmentTimer, associated with the TAG containing the Serving Cell on which the
          HARQ feedback is to be transmitted, is running:
            5> indicate a positive acknowledgement for the SPS deactivation to the physical layer.
      3> else if PDCCH content indicates SPS activation:
        4> [. . .]

Based on the 3GPP TS 38.213, the UE/PHY may determine whether the PDCCH contents indicate the SPS PDSCH release/SPS deactivation, according to one or more criteria. In some implementations, the UE/PHY may validate the PDCCH content to indicate the SPS PDSCH release/SPS deactivation if at least one of the following conditions (a)-(f) is satisfied.

(a) If the CRC of a corresponding DCI format is scrambled with a CS-RNTI provided by the BS.
(b) If the new data indicator (NDI) field in the DCI format for the enabled transport block is set to '0.'
(c) If the DFI flag field, if present, in the DCI format is set to '0.'
(d) If the validation is for scheduling activation and if the PDSCH-to-HARQ feedback timing indicator field in the DCI format is present, the PDSCH-to-HARQ feedback timing indicator field may not provide an inapplicable value from a parameter dl-DataToUL-ACK-r16.
(e) If the UE is provided with a single configuration for UL grant Type 2 PUSCH or for SPS PDSCH, validation of the DCI format may be achieved if all fields for the DCI format are set according to Table 2 or Table 3, as demonstrated below.
(f) If the UE is provided with more than one configuration for the UL grant Type 2 PUSCH or for the SPS PDSCH, validation of the DCI format may be achieved if all fields for the DCI format are set according to Table 4, as illustrated below.

Table 2 below includes an example of special fields for single DL SPS or single UL grant Type 2 scheduling activation PDCCH validation when a UE is provided with a single SPS PDSCH or UL grant Type 2 configuration in the active DL/UL BWP of the scheduled cell.

TABLE 2

| | DCI format 0_0/0_1/0_2 | DCI format 1_0/1_2 | DCI format 1_1 |
|---|---|---|---|
| HARQ process number | set to all '0's | set to all '0's | set to all '0's |
| Redundancy version | set to all '0's | set to all '0's | For the enabled transport block: set to all '0's |

Table 3 below includes an example of special fields for single DL SPS or single UL grant Type 2 scheduling release PDCCH validation when a UE is provided with a single SPS PDSCH or UL grant Type 2 configuration in the active DL/UL BWP of the scheduled cell.

TABLE 3

| | DCI format 0_0/0_1/0_2 | DCI format 1_0/1_1/1_2 |
|---|---|---|
| HARQ process number | set to all '0's | set to all '0's |
| Redundancy version | set to all '0's | set to all '0's |
| Modulation and coding scheme | set to all '1's | set to all '1's |
| Frequency domain resource assignment | set to all '0's for FDRA Type 2 with $\mu = 1$ set to all '1's, otherwise | set to all '0's for FDRA Type 0 or for dynamicSwitch set to all '1's for FDRA Type 1 |

Table 4 below includes an example of special fields for a single or multiple DL SPS and UL grant Type 2 scheduling release PDCCH validation when a UE is provided multiple DL SPS or UL grant Type 2 configurations in the active DL/UL BWP of the scheduled cell.

TABLE 4

| | DCI format 0_0/0_1/0_2 | DCI format 1_0/1_1/1_2 |
|---|---|---|
| Redundancy version | set to all '0's | set to all '0's |
| Modulation and coding scheme | set to all '1's | set to all '1's |
| Frequency domain resource assignment | set to all '0's for FDRA Type 2 with $\mu = 1$ set to all '1's, otherwise | set to all '0's for FDRA Type 0 or for dynamicSwitch set to all '1's for FDRA Type 1 |

If at least one of the conditions (a)-(f), as described above, is satisfied, the UE may consider the information in the DCI format (e.g., PDCCH contents) as a valid SPS PDSCH release/SPS deactivation. If at least one of the conditions (a)-(f), as described above, is not satisfied, the UE may discard all the information in the DCI format. The UE may provide HARQ-ACK information in response to an SPS PDSCH release/SPS deactivation after N symbols from the last symbol of a PDCCH providing the SPS PDSCH release/SPS deactivation. If the UE provides HARQ-ACK information in response to an SPS PDSCH release/SPS deactivation, the MAC entity of the UE may indicate a positive acknowledgement for the SPS deactivation to the physical layer.

In some implementations, the HARQ feedback (for DL), e.g., for a HARQ process, may be disabled and/or enabled, e.g., by an RRC configuration from a NW. If the HARQ feedback (for a HARQ process) is disabled, the UE may not need to transmit a HARQ feedback (for the HARQ process). On the other hand, with regards to the SPS activation (e.g., SPS PDSCH transmission including SPS activation), there is no additional requirement for the HARQ-ACK feedback after the reception of the corresponding DCI, since the corresponding confirmation may be implicitly known by the gNB, e.g., via the reception of a HARQ-ACK after the reception of an SPS PDSCH. In this manner, once the UE fails to detect an activation of the DCI, e.g., without a corresponding feedback, continuous errors may occur for the PDSCH transmissions.

In some implementations, the UE may provide a HARQ feedback (e.g., HARQ-ACK information/positive acknowledgement) in response to an SPS PDSCH release/SPS deactivation (and/or SPS activation) regardless of whether the HARQ feedback is disabled or not.

The UE may provide a HARQ feedback (e.g., HARQ-ACK information/positive acknowledgement) in response to an SPS PDSCH release/SPS deactivation (and/or SPS activation) even if the HARQ feedback for the UE is disabled. Specifically, the MAC entity of the UE may indicate a positive acknowledgement for the SPS deactivation (and/or SPS activation) to the physical layer even if the HARQ feedback for the UE is disabled.

In some implementations, a UE may provide a HARQ feedback (e.g., HARQ-ACK information/positive acknowledgement) in response to an SPS PDSCH release/SPS deactivation (and/or SPS activation) even if the HARQ feedback for a HARQ process is disabled. In some such implementations, the HARQ process may be a HARQ process indicated by the PDCCH of the SPS PDSCH release/SPS deactivation (and/or SPS activation). Specifically, the MAC entity of the UE may indicate a positive acknowledgement for the SPS deactivation (and/or SPS activation) to the physical layer even if the HARQ feedback for a HARQ process is disabled. The HARQ process may be a HARQ process indicated by the PDCCH of the SPS PDSCH release/SPS deactivation (and/or SPS activation).

In some implementations, the UE may determine whether to provide a HARQ feedback (e.g., HARQ-ACK information/positive acknowledgement) in response to an SPS PDSCH release/SPS deactivation (and/or SPS activation) based on whether the HARQ feedback (e.g., for a HARQ process and/or for a UE) is disabled (e.g., via an RRC configuration/downlinkHARQ-FeedbackDisabled IE and/or HARQ-feedbackEnabling-disablingperHARQprocess IE). If the HARQ feedback for the UE is disabled (e.g., via an RRC configuration/downlinkHARQ-FeedbackDisabled IE and/or HARQ-feedbackEnabling-disablingperHARQprocess IE), the UE may not provide a HARQ feedback (e.g., HARQ-ACK information/positive acknowledgement) in response to an SPS PDSCH release/SPS deactivation (and/or SPS activation). Specifically, if the HARQ feedback for the UE is disabled, the MAC entity of the UE may not indicate a positive acknowledgement for the SPS deactivation (and/or SPS activation) to the physical layer. If the HARQ feedback for a HARQ process is disabled (e.g., via an RRC configuration/downlinkHARQ-FeedbackDisabled IE and/or HARQ-feedbackEnabling-disablingperHARQprocess IE), where the HARQ process is a HARQ process indicated by the PDCCH of the SPS PDSCH release/SPS deactivation (and/or SPS activation), the UE may not provide a HARQ feedback (e.g., HARQ-ACK information/positive acknowledgement) in response to an SPS PDSCH release/SPS deactivation (and/or SPS activation). Specifically, if the HARQ feedback for a HARQ process is disabled, where the HARQ process is a HARQ process indicated by the PDCCH of the SPS PDSCH release/SPS deactivation (and/or SPS activation), the MAC entity of the UE may not indicate a positive acknowledgement for the SPS deactivation (and/or SPS activation) to the physical layer.

In some implementations, the UE may determine whether to provide a HARQ feedback (e.g., HARQ-ACK information/positive acknowledgement) in response to an SPS PDSCH release/SPS deactivation (and/or SPS activation) based on an indication/configuration indicated by the NW. The indication/configuration may indicate that the HARQ feedback for the SPS PDSCH release/SPS deactivation (and/or SPS activation) is enabled or disabled.

If the indication indicates that the HARQ feedback for the SPS PDSCH release/SPS deactivation (and/or SPS activation) is enabled, the UE may provide a HARQ feedback (e.g., HARQ-ACK information/positive acknowledgement) in response to an SPS PDSCH release/SPS deactivation (and/or SPS activation). Specifically, if the indication indicates that the HARQ feedback for the SPS PDSCH release/SPS deactivation (and/or SPS activation) is enabled, the MAC entity of the UE may indicate a positive acknowledgement for the SPS deactivation (and/or SPS activation) to the physical layer. If the indication indicates that the HARQ feedback for the SPS PDSCH release/SPS deactivation (and/or SPS activation) is enabled, the UE may report ACK/NACK for the first SPS PDSCH after the activation, regardless of whether the HARQ feedback is enabled or disabled corresponding to the first SPS PDSCH after the activation. Otherwise, the UE may follow the configuration of the HARQ feedback enabled/disabled corresponding to the first SPS PDSCH after the activation.

If the indication indicates that the HARQ feedback for the SPS PDSCH release/SPS deactivation (and/or SPS activation) is disabled, the UE may not provide a HARQ feedback (e.g., HARQ-ACK information/positive acknowledgement) in response to an SPS PDSCH release/SPS deactivation (and/or SPS activation). Specifically, if the indication indicates that the HARQ feedback for the SPS PDSCH release/SPS deactivation (and/or SPS activation) is disabled, the MAC entity of the UE may not indicate a positive acknowledgement for the SPS deactivation (and/or SPS activation) to the physical layer.

The indication may be an RRC/MAC/PHY signaling. The indication may be indicated by a HARQ-feedbackEnabling-forSPSactive IE. The indication may be indicated by the PDCCH of the SPS PDSCH release/SPS deactivation (and/or SPS activation). The indication may be included in an IE, e.g., at least one of MAC-CellgroupConfig IE, PDCCH-config IE, PDCCH-ServingCellConfig IE, PDSCH-ServingCellConfig IE, ServingCellConfig IE, BWP-DownlinkDedicated IE, PDCCH-config 1E, PDSCH-config IE, and sps-config IE. The indication may be referred to as a HARQ feedback disabled indication. The indication may indicate a specific HARQ process (e.g., HARQ process ID 0 and/or the largest number of the HARQ process ID). The indication may indicate a specific HARQ process, where the HARQ feedback of the specific HARQ process is enabled or not disabled. The specific HARQ process may not be allowed to disable the HARQ feedback. The indication may indicate the information of HARQ process number.

In some implementations, the UE may determine whether to provide a HARQ feedback (e.g., HARQ-ACK information/positive acknowledgement) in response to an SPS PDSCH release/SPS deactivation (and/or SPS activation) based on a specific HARQ process.

If the UE is indicated with the specific HARQ process (by the PDCCH of the SPS PDSCH release/SPS deactivation (and/or SPS activation)), the UE may provide a HARQ feedback (e.g., HARQ-ACK information/positive acknowledgement) in response to an SPS PDSCH release/SPS deactivation (and/or SPS activation). Specifically, if the UE is indicated with the specific HARQ process (by the PDCCH of the SPS PDSCH release/SPS deactivation (and/or SPS activation)), the MAC entity of the UE may indicate a positive acknowledgement for the SPS deactivation (and/or SPS activation) to the physical layer.

If a HARQ process number in a DCI format indicating SPS PDSCH release is associated with a HARQ process for which the HARQ feedback is disabled (by RRC signaling), the UE may or may not expect to provide HARQ-ACK information after N symbols from the last symbol of a PDCCH providing the SPS PDSCH release (and/or SPS activation).

The UE may ignore the HARQ process number field in a DCI format indicating the SPS PDSCH release (and/or SPS activation). If the UE is not indicated with the specific HARQ process (by the PDCCH of the SPS PDSCH release/SPS deactivation (and/or SPS activation)), the UE may not provide a HARQ feedback (e.g., HARQ-ACK information/positive acknowledgement) in response to an SPS PDSCH release/SPS deactivation (and/or SPS activation). Specifically, if the UE is not indicated with the specific HARQ process (by the PDCCH of the SPS PDSCH release/SPS deactivation (and/or SPS activation)), the MAC entity of the UE may not indicate a positive acknowledgement for the SPS deactivation (and/or SPS activation) to the physical layer. The specific HARQ process may be a HARQ process which should not be disabled the corresponding HARQ feedback. Specifically, the NW may not disable the HARQ feedback of the HARQ process. The specific HARQ process may be associated with a specific identifier of the HARQ process (e.g., HARQ process ID 0 and/or the largest number of the HARQ process ID).

The specific HARQ process may be derived based on an equation for a DL transmission scheduled by the PDCCH of the SPS PDSCH release/SPS deactivation (and/or SPS activation). The equation may be an equation as specified in the 3GPP TS 38.321, e.g., HARQ Process ID=[floor (CURRENT slot×10/(numberOfSlotsPerFrame×periodicity))] modulo nrofHARQ-Processes. The equation may be an equation as specified in the 3GPP TS 38.321, e.g., HARQ Process ID=[floor (CURRENT slot×10/(numberOfSlotsPerFrame×periodicity))] modulo nrofHARQ-Processes+harqProcID-Offset.

If the UE derives the specific HARQ process (ID) based on an equation for a DL transmission scheduled by the PDCCH of the SPS PDSCH release/SPS deactivation (and/or SPS activation), the UE may determine whether to provide a HARQ feedback (e.g., HARQ-ACK information/positive acknowledgement) in response to an SPS PDSCH release/SPS deactivation (and/or SPS activation) based on whether the specific HARQ process is enabled/disabled. If the UE derives the specific HARQ process (ID) based on an equation for a DL transmission scheduled by the PDCCH of the SPS PDSCH release/SPS deactivation (and/or SPS activation), the MAC entity of the UE may determine whether to indicate a positive acknowledgement for the SPS deactivation (and/or SPS activation) to the physical layer based on whether the specific HARQ process is enabled/disabled.

In some implementations, if HARQ feedback is disabled for an SPS reception, or all SPS receptions provided by an SPS configuration, the UE may generate a HARQ-ACK information bit for the SPS PDSCH release/SPS deactivation (and/or SRS activation). If HARQ feedback is disabled for an SPS reception, or all SPS receptions provided by an SPS configuration, the UE may receive the SPS PDSCH for a HARQ process if the associated HARQ feedback is disabled. If the UE does not provide the HARQ-ACK information in response to an SPS PDSCH release/SPS deactivation (and/or SPS activation) (e.g., the MAC entity of the UE does not indicate a positive acknowledgement for the SPS deactivation (and/or SPS activation) to the physical layer), the UE/MAC entity may trigger a procedure and/or transmit a MAC CE to the NW. If HARQ feedback is disabled for all HARQ processes and the UE receives a PDSCH without receiving a corresponding PDCCH, the UE may generate HARQ-ACK information bits. If HARQ feedback is disabled for all HARQ processes and the UE receives a PDCCH indicating an SPS PDSCH release (and/or SPS activation), the UE may generate HARQ-ACK information bits. If HARQ feedback is disabled for all HARQ processes, the UE may report HARQ-ACK information bits for SPS PDSCH release in a slot indicated by a value of a PDSCH-to-HARQ feedback timing indicator field in a corresponding DCI format.

In the following, HARQ feedback for Msg4/MsgB is described.

In 5G NR, the following two types (a) and (b) of random access procedures are supported. (a) 4-step RA type (with Msg1, Msg2, Msg3, and/or Msg4), e.g., CFRA and/or 4-step CBRA. (b) 2-step RA type (with MsgA, and/or MsgB), e.g., 2-step CFRA and/or 2-step CBRA. Msg1 may be a preamble transmission of the RA procedure for RA procedure with 4-step type. Msg 2 may be a RAR of the RA procedure for 4-step RA type. The RAR may be a response to Msg1 in the 4-step RA procedure. Msg3 may be a message transmitted on UL-SCH containing a C-RNTI MAC CE or CCCH SDU, submitted from upper layer and associated with the UE Contention Resolution Identity, as part of 4-step random access procedure. Mgs4 may be a PDCCH transmission for the contention resolution in the 4-step RA procedure. If the UE considers the contention resolution of the RA procedure is successful, the UE may consider the RA procedure successfully completed. MsgA may be preamble and payload transmissions of the RA procedure for 2-step RA type. MsgB may be a response to MsgA in the 2-step RA procedure. MsgB may consist of response(s) for contention resolution, fallback indication(s), and/or backoff indication.

In some implementation, the UE may transmit HARQ feedback for the MAC PDU, including the UE CRID MAC CE, based on some information (e.g., HARQ process number, ChannelAccess-CPext, TPC, TPC command for scheduled PUCCH, HARQ feedback timing indicator, PDSCH-to-HARQ feedback timing indicator, PUCCH resource indicator, etc.) indicated by the PDCCH/DCI (e.g., DCI format 1_0) for the Msg4 which transmits the MAC PDU including the UE CRID MAC CE. In response to a PUSCH transmission scheduled by a RAR UL grant when a UE has not been provided with a C-RNTI, the UE may attempt to detect a DCI format 1_0 with CRC scrambled by a corresponding TC-RNTI scheduling a PDSCH that includes a UE contention resolution identity. In response to the PDSCH reception with the UE contention resolution identity, the UE may transmit HARQ-ACK information in a PUCCH. The PUCCH transmission may be within the same active UL BWP as the PUSCH transmission. The Msg4 may be received, from the NW, based on a PDCCH transmission while the timer ra-ContentionResolutionTimer is running. The Msg 4 may be received on a PDSCH that includes a UE contention resolution identity. The Msg4 may be received in response to a PUSCH transmission scheduled by a RAR UL grant (e.g., Msg3).

In some implementations, the UE may transmit the HARQ feedback for the MAC PDU, including the UE CRID MAC CE, based on some information (e.g., HARQ process number, ChannelAccess-CPext, TPC, TPC command for scheduled PUCCH, HARQ feedback timing indicator, PDSCH-to-HARQ feedback timing indicator, PUCCH resource indicator, etc.) indicated by the successRAR MAC subPDU for the MsgB which transmits the MAC PDU including UE CRID MAC CE. The MsgB may be received, from the NW, based on a PDCCH transmission while the timer msgB-ResponseWindow is running. The MsgB may be received on a PDSCH that includes a UE contention resolution identity. The MsgB may be received in response to a MsgA transmission. The MsgB may contain a successRAR MAC subPDU. The Msg4 and/or MsgB may indicate PDSCH reception with the UE contention resolution identity.

In some implementations, the HARQ feedback (for DL), e.g., for a HARQ process, may be disabled, e.g., by an RRC configuration from the NW. If the HARQ feedback (for a HARQ process) is disabled, the UE may not need to transmit a HARQ feedback (for the HARQ process). The UE may transmit a HARQ feedback (e.g., HARQ-ACK information/positive acknowledgement) in response to the PDSCH reception with the UE contention resolution identity regardless of whether the HARQ feedback is disabled or not. The UE may transmit a HARQ feedback (e.g., HARQ-ACK information/positive acknowledgement), in response to the PDSCH reception with the UE contention resolution identity even if the HARQ feedback for the UE is disabled. The UE may transmit a HARQ feedback (e.g., HARQ-ACK information/positive acknowledgement), in response to the PDSCH reception with the UE contention resolution identity even if the HARQ feedback for a HARQ process is disabled, where the HARQ process is a HARQ process indicated by the PDCCH for the PDSCH reception with the UE contention resolution identity.

In some implementations, the UE may determine whether to transmit a HARQ feedback (e.g., HARQ-ACK information/positive acknowledgement) in response to a PDSCH reception with the UE contention resolution identity (e.g., Msg4) based on at least one field indicated by a PDCCH which schedules the PDSCH with the UE contention resolution identity. The PDCCH may be a DCI format 1_0 (with CRC scrambled by a corresponding C-RNTI). The at least one field indicated by a PDCCH which schedules the PDSCH with the UE contention resolution identity may be at least one field/information transmitted by means of the DCI format 1_0. (e.g., at least one of a specific indication, NDI, RV, HARQ process number, downlink assignment index, TPC command for scheduled PUCCH, PUCCH resource indicator, PDSCH-to-HARQ feedback timing indicator, and ChannelAccess-CPext). A specific field (indicated by a PDCCH which schedules the PDSCH with the UE contention resolution identity) may be used to indicate the UE whether to transmit a HARQ feedback (e.g., HARQ-ACK information/positive acknowledgement), in response to the PDSCH reception with the UE contention resolution identity (e.g., Msg4).

If the HARQ process number (indicated by a PDCCH which schedules the PDSCH with the UE contention resolution identity) indicates a HARQ process ID for which the HARQ feedback is disabled, the UE may not transmit a HARQ feedback (e.g., HARQ-ACK information/positive acknowledgement), in response to the PDSCH reception with the UE contention resolution identity. If the HARQ process number (indicated by a PDCCH which schedules the PDSCH with the UE contention resolution identity) indicates a HARQ process ID for which the HARQ feedback is disabled, the UE may ignore at least one field included in the PDCCH for the PDSCH reception with the UE contention resolution identity. The at least one field included in the PDCCH for the PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s). If the HARQ process number (indicated by a PDCCH which schedules the PDSCH with the UE contention resolution identity) indicates a HARQ process ID for which the HARQ feedback is disabled, the UE may consider at least one field included in the PDCCH for PDSCH reception with the UE contention resolution identity is absent. The at least one field included in the PDCCH for PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s).

If the PDCCH/DCI (which schedules the PDSCH with the UE contention resolution identity) is scrambled by a specific RNTI, at least one field/information may be absent or not configured (e.g., at least one of NDI, RV, HARQ process number, downlink assignment index, TPC command for scheduled PUCCH, PUCCH resource indicator, PDSCH-to-HARQ feedback timing indicator, and ChannelAccess-CPext). If the NW would disable the HARQ feedback for the PDSCH reception with the UE contention resolution identity, the PDCCH for the PDSCH reception with the UE contention resolution identity should be scrambled by the specific RNTI (e.g., which is not the C-RNTI or TC-RNTI).

If at least one field/information included in the PDCCH which schedules the PDSCH with the UE contention resolution identity is absent or not configured, the UE may not transmit a HARQ feedback (e.g., HARQ-ACK information/positive acknowledgement), in response to the PDSCH reception with the UE contention resolution identity. The at least one field/information included in the PDCCH which schedules the PDSCH with the UE contention resolution identity may be at least one of NDI, RV, HARQ process number, downlink assignment index, TPC command for scheduled PUCCH, PUCCH resource indicator, PDSCH-to-HARQ feedback timing indicator, and ChannelAccess-CPext.

In some implementations, the UE may determine whether to transmit a HARQ feedback (e.g., HARQ-ACK information/positive acknowledgement), in response to the PDSCH reception with the UE contention resolution identity (e.g., MsgB) based on at least one field of the successRAR MAC subPDU for the MsgB, wherein the MsgB is scheduled by a PDCCH. The PDCCH may be a DCI format 1_0 (with CRC scrambled by a corresponding MsB-RNTI). A new field (e.g., using a reserved bit) of the success RAR MAC subPDU may be used to indicate the UE whether to transmit a HARQ feedback (e.g., HARQ-ACK information/positive acknowledgement), in response to the PDSCH reception with the UE contention resolution identity (e.g., MsgB). The at least one field of the successRAR MAC subPDU for the MsgB may be at least one field/information, e.g., at least one of ChannelAccess-CPext, TPC, HARQ Feedback Timing Indicator, and PUCCH Resource Indicator. A specific field (indicated by a PDCCH which schedules the PDSCH with the UE contention resolution identity and/or by the successRAR MAC subPDU) may be used to indicate the UE whether to transmit a HARQ feedback (e.g., HARQ-ACK information/positive acknowledgement), in response to the PDSCH reception with the UE contention resolution identity (e.g., MsgB).

In some implementations, if the HARQ process number (indicated by a PDCCH which schedules the PDSCH with the UE contention resolution identity and/or by the successRAR MAC subPDU) indicates a HARQ process ID for which the HARQ feedback is disabled, the UE may not transmit a HARQ feedback (e.g., HARQ-ACK information/positive acknowledgement), in response to the PDSCH reception with the UE contention resolution identity.

If the HARQ process number (indicated by a PDCCH which schedules the PDSCH with the UE contention resolution identity and/or by the successRAR MAC subPDU) indicates a HARQ process ID for which the HARQ feedback is disabled, the UE may ignore at least one field included in the PDCCH for PDSCH reception with the UE contention resolution identity. The at least one field included in the PDCCH for PDSCH reception with the UE contention resolution identity may be at least one the TPC command for scheduled PUCCH field, the PUCCH resource indication field, the PDSCH-to-HARQ feedback timing indicator field, and the ChannelAccess-CPex field(s).

If the HARQ process number (indicated by a PDCCH which schedules the PDSCH with the UE contention resolution identity and/or by the successRAR MAC subPDU) indicates a HARQ process ID for which the HARQ feedback is disabled, the UE may consider at least one field included in the PDCCH for PDSCH reception with the UE contention resolution identity is absent. The at least one field included in the PDCCH for PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s).

In some implementations, if the PDCCH/DCI (which schedules the PDSCH with the UE contention resolution identity) is scrambled by a specific RNTI, at least one field/information of the successRAR MAC subPDU for the MsgB may be absent or not configured (e.g., at least one of ChannelAccess-CPext, TPC, HARQ Feedback Timing Indicator, and PUCCH Resource Indicator). If the NW disables the HARQ feedback for the PDSCH reception with the UE contention resolution identity, the PDCCH for the PDSCH reception with the UE contention resolution identity should be scrambled by the specific RNTI (e.g., which is not the MsgB-RNTI).

In some implementations, if at least one field/information included in the successRAR MAC subPDU is absent or not configured, the UE may not transmit a HARQ feedback (e.g., HARQ-ACK information/positive acknowledgement), in response to the PDSCH reception with the UE contention resolution identity. The at least one field/information included in the successRAR MAC subPDU may be at least one of ChannelAccess-CPext, TPC, HARQ Feedback Timing Indicator, and PUCCH Resource Indicator.

If the UE is not expected to transmit a HARQ feedback, in response to the PDSCH reception with the UE contention resolution identity (e.g., MsgB), based on the circumstances mentioned in the present disclosure, the MAC entity of the UE may not deliver the TPC, PUCCH resource Indicator, ChannelAccess-CPext (if indicated), and HARQ feedback Timing Indicator (received in successRAR) to lower layers/PHY. On the contrary, if the UE is expected to transmit a HARQ feedback, in response to the PDSCH reception with the UE contention resolution identity (e.g., MsgB), based on the circumstances mentioned in the present disclosure, the MAC entity of the UE may deliver the TPC, PUCCH resource Indicator, ChannelAccess-CPext (if indicated), and HARQ feedback Timing Indicator (received in successRAR) to lower layers/PHY.

In some implementations, for the PDSCH reception with the UE contention resolution identity (e.g., Msg4/MsgB), a specific HARQ process identifier may be used (e.g., HARQ process identifier 0 or the largest number of the HARQ process). The UE may use the HARQ buffer of the specific HARQ process identifier to receive the PDSCH with the UE contention resolution identity (e.g., Msg4/MsgB). The HARQ feedback of the specific HARQ process is enabled or not disabled. The specific HARQ process may not be allowed to disable the HARQ feedback.

In some implementations, the UE may determine whether to transmit a HARQ feedback (e.g., HARQ-ACK information/positive acknowledgement), in response to the PDSCH reception with the UE contention resolution identity based on whether the HARQ feedback is disabled.

If the HARQ feedback for the UE is disabled, the UE may not transmit a HARQ feedback (e.g., HARQ-ACK information/positive acknowledgement), in response to the PDSCH reception with the UE contention resolution identity. If the HARQ feedback for the UE is disabled, the UE may ignore at least one field included in the PDCCH for PDSCH reception with the UE contention resolution identity. The at least one field included in the PDCCH for PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s). If the HARQ feedback for the UE is disabled, the UE may consider at least one field included in the PDCCH for PDSCH reception with the UE contention resolution identity is absent. The at least one field included in the PDCCH for PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s). If the HARQ feedback for the UE is disabled, the UE may not be indicated to transmit the PUCCH with the HARQ-ACK information.

If the HARQ feedback for a HARQ process is disabled, where the HARQ process is a HARQ process indicated by the PDCCH for the PDSCH reception with the UE contention resolution identity, the UE may not transmit a HARQ feedback (e.g., HARQ-ACK information/positive acknowledgement), in response to the PDSCH reception with the UE contention resolution identity. If the HARQ feedback for a HARQ process is disabled, where the HARQ process is a HARQ process indicated by the PDCCH for the PDSCH reception with the UE contention resolution identity, the UE may ignore at least one field included in the PDCCH for PDSCH reception with the UE contention resolution identity. The at least one field included in the PDCCH for PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s). If the HARQ feedback for a HARQ process is disabled, the UE may not be indicated to transmit the PUCCH with the HARQ-ACK information for the HARQ process. If the HARQ feedback for a HARQ process is disabled, where the HARQ process is a HARQ process indicated by the PDCCH for the PDSCH reception with the UE contention resolution identity, the UE may consider at least one field included in the PDCCH for PDSCH reception with the UE contention resolution identity is absent. The at least one field included in the PDCCH for PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s).

In some implementations, the UE may determine whether to transmit a HARQ feedback (e.g., HARQ-ACK information/positive acknowledgement), in response to the PDSCH reception with the UE contention resolution identity, based on an indication indicated by the NW. The indication may indicate that the HARQ feedback for the PDSCH reception with the UE contention resolution identity is enabled/disabled.

If the indication indicates that the HARQ feedback for the PDSCH reception with the UE contention resolution identity is enabled, the UE may transmit a HARQ feedback (e.g., HARQ-ACK information/positive acknowledgement) in response to the PDSCH reception with the UE contention resolution identity. If the indication indicates that the HARQ feedback for the PDSCH reception with the UE contention resolution identity is disabled, the UE may not provide a HARQ feedback (e.g., HARQ-ACK information/positive acknowledgement) in response to the PDSCH reception with the UE contention resolution identity. If the indication indicates that the HARQ feedback for the PDSCH reception with the UE contention resolution identity is disabled, the UE may ignore at least one field included in the PDCCH for the PDSCH reception with the UE contention resolution identity. The at least one field included in the PDCCH for the PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s). If the indication indicates that the HARQ feedback for the PDSCH reception with the UE contention resolution identity is disabled, the UE may consider at least one field included in the PDCCH for PDSCH reception with the UE contention resolution identity is absent. The at least one field included in the PDCCH for PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s).

The indication may be an RRC/MAC/PHY signaling. The indication may be indicated by the PDCCH for the PDSCH reception with the UE contention resolution identity. The indication may be included in an IE, e.g., at least one of MAC-CellgroupConfig IE, PDCCH-config IE, PDCCH-ServingCellConfig IE, PDSCH-ServingCellConfig IE, ServingCellConfig IE, BWP-DownlinkDedicated IE, PDCCH-config IE, PDSCH-config IE, RACH-ConfigCommon IE, RACH-ConfigCommonTwoStepRA IE, RACH-ConfigDedicated IE, RACH-ConfigGeneric IE, and RACH-ConfigGenericTwoStepRA IE. The indication may be referred to as a HARQ feedback disabled indication. The indication may indicate a specific HARQ process (e.g., HARQ process ID 0 and/or the largest number of the HARQ process ID). The indication may indicate a specific HARQ process, wherein the HARQ feedback of the specific HARQ process is enabled or not disabled. The specific HARQ process may not be allowed to disable the HARQ feedback. The indication may indicate the information of HARQ process number.

In some implementations, the UE may determine whether to transmit a HARQ feedback (e.g., HARQ-ACK information/positive acknowledgement), in response to the PDSCH reception with the UE contention resolution identity, based on a specific HARQ process.

If the UE is indicated with the specific HARQ process (by the PDCCH for the PDSCH reception with the UE contention resolution identity), the UE may transmit a HARQ feedback (e.g., HARQ-ACK information/positive acknowledgement), in response to the PDSCH reception with the UE contention resolution identity. If the UE is not indicated with the specific HARQ process (by the PDCCH for the PDSCH reception with the UE contention resolution identity), the UE may not transmit a HARQ feedback (e.g., HARQ-ACK information/positive acknowledgement), in response to the PDSCH reception with the UE contention resolution identity. If the UE is not indicated with the specific HARQ process (by the PDCCH for the PDSCH reception with the UE contention resolution identity), the UE may ignore at least one field included in the PDCCH for PDSCH reception with the UE contention resolution identity. The at least one field included in the PDCCH for PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s). If the UE is not indicated with the specific HARQ process (by the PDCCH for the PDSCH reception with the UE contention resolution identity), the UE may consider at least one field included in the PDCCH for PDSCH reception with the UE contention resolution identity is absent. The at least one field included in the PDCCH for PDSCH reception with the UE contention resolution identity may be at least one of the TPC command for scheduled PUCCH field, the PUCCH resource indication field, the PDSCH-to-HARQ feedback timing indicator field, and the ChannelAccess-CPex field(s).

The specific HARQ process may be a HARQ process which should not be disabled the corresponding HARQ feedback. Specifically, the NW may not disable the HARQ feedback of the HARQ process. The specific HARQ process may be associated with a specific identifier of the HARQ process (e.g., HARQ process ID 0 and/or the largest number of the HARQ process ID).

In some implementation, the UE may transmit HARQ-ACK information in a PUCCH in response to the PDSCH reception with the UE contention resolution identity, if the associated HARQ feedback is not disabled and if a time gap between the last symbol of the PDSCH reception and the first symbol of the corresponding PUCCH transmission with the HARQ-ACK information is equal to or greater than N1+0.5 ms, where N1 corresponds to UE processing capability.

On the basis of the 3GPP TS 38.321, when the UE receives a Timing Advance (TA) Command in a RAR message for a serving cell belonging to a TAG or in a MsgB for an SpCell, and if the timeAlignmentTimer (i.e., TA timer) associated with the TAG is not running, the UE may start the timeAlignmentTimer associated with the TAG. After that, when the UE considers the Contention Resolution is successful for SI request, after transmitting HARQ feedback for a MAC PDU including UE Contention Resolution Identity (UE CRID) MAC CE, the UE may stop timeAlignmentTimer associated with this TAG. The MAC PDU including UE Contention Resolution Identity MAC CE may be received, from the NW, based on a PDCCH for a Msg4/MsgB (e.g., after Msg3/MsgA is transmitted by the UE).

In some implementations, the HARQ feedback (for DL), e.g., for a HARQ process, may be disabled, e.g., by an RRC configuration from the NW. If the HARQ feedback (for a HARQ process) is disabled, the UE may not need to transmit a HARQ feedback (for the HARQ process). If the UE is not expected to transmit a HARQ feedback, in response to the PDSCH reception with the UE contention resolution identity (e.g., a MAC PDU including UE Contention Resolution Identity (UE CRID) MAC CE), based on the circumstances mentioned in the present disclosure (e.g., the HARQ feedback for PDSCH reception with the UE contention resolution identity is disabled), the UE may stop timeAlignmentTimer when the UE considers the Contention Resolution is successful for SI request, e.g., without transmitting HARQ feedback for a MAC PDU including UE Contention Resolution Identity (UE CRID) MAC CE. If the UE is not expected to transmit a HARQ feedback, in response to the PDSCH reception with the UE contention resolution identity (e.g., a MAC PDU including UE Contention Resolution Identity (UE CRID) MAC CE), based on the circumstances mentioned in the present disclosure (e.g., the HARQ feedback for PDSCH reception with the UE contention resolution identity is disabled), the UE may not stop timeAlignmentTimer when the UE considers the Contention Resolution is successful for SI request.

A UE may validate, for scheduling activation or scheduling release, a DL SPS assignment PDCCH or a configured UL grant Type 2 PDCCH if one or more or all of the criteria (a)-(d) are fulfilled. (a) the CRC of a corresponding DCI format is scrambled with a CS-RNTI provided by cs-RNTI. (b) the new data indicator field in the DCI format for the enabled transport block is set to '0.' (c) the DFI flag field, if present, in the DCI format is set to '0.' (d) if validation is for scheduling activation and if the PDSCH-to-HARQ feedback timing indicator field in the DCI format is present, the PDSCH-to-HARQ feedback timing indicator field does not provide an inapplicable value from dl-DataToUL-ACK-r16.

If a UE is provided with a single configuration for UL grant Type 2 PUSCH or for SPS PDSCH, the validation of the DCI format may be achieved if all fields for the DCI format are set according to Table 2 or Table3. If a UE is provided with more than one configuration for UL grant Type 2 PUSCH or for SPS PDSCH, a value of the HARQ process number field in a DCI format may indicate an activation for a corresponding UL grant Type 2 PUSCH or for an SPS PDSCH configuration with a same value as provided by ConfiguredGrantConfigIndex or by sps-ConfigIndex, respectively. The validation of the DCI format may be achieved if the RV field for the DCI format is set according to Table 5. Table 5 below include an example of special fields for a single DL SPS or single UL grant Type 2 scheduling activation PDCCH validation when a UE is provided multiple DL SPS or UL grant Type 2 configurations in the active DL/UL BWP of the scheduled cell.

TABLE 5

| | DCI format 0_0/0_1/0_2 | DCI format 1_0/1_2 | DCI format 1_1 |
|---|---|---|---|
| Redundancy version | set to all '0's | set to all '0's | For the enabled transport block: set to all '0's |

If a UE is provided with more than one configuration for UL grant Type 2 PUSCH or for SPS PDSCH, and the UE is provided with ConfiguredGrantConfigType2DeactivationStateList or sps-ConfigDeactivationStateList, a value of the HARQ process number field in a DCI format may indicate a corresponding entry for scheduling release of one or more UL grant Type 2 PUSCH or SPS PDSCH configurations. If a UE is provided with more than one configuration for UL grant Type 2 PUSCH or for SPS PDSCH, and the UE is not provided with ConfiguredGrantConfigType2DeactivationStateList or sps-ConfigDeactivationStateList, a value of the HARQ process number field in a DCI format may indicate a release for a corresponding UL grant Type 2 PUSCH or for an SPS PDSCH configuration with a same value as provided by ConfiguredGrantConfigIndex or by sps-ConfigIndex, respectively. The validation of the DCI format may be achieved if all fields for the DCI format are set according to Table 4. If the validation is achieved, the UE may consider the information in the DCI format as a valid activation or valid release of DL SPS or configured UL grant Type 2. If the validation is not achieved, the UE may discard all the information in the DCI format.

A UE may provide HARQ-ACK information in response to an SPS PDSCH release after N symbols from the last symbol of a PDCCH providing the SPS PDSCH release. If processingType2Enabled of PDSCH-ServingCellConfig is set to enable for the serving cell with the PDCCH providing the SPS PDSCH release, N=5 for $\mu$=0, N=5.5 for $\mu$=1, and N=11 for $\mu$=2, otherwise, N=10 for $\mu$=0, N=12 for $\mu$=1, N=22 for $\mu$=2, and N=25 for $\mu$=3, wherein $\mu$ corresponds to the smallest SCS configuration between the SCS configuration of the PDCCH providing the SPS PDSCH release and the SCS configuration of a PUCCH carrying the HARQ-ACK information in response to an SPS PDSCH release.

FIG. 3 is a flowchart illustrating a method/process 300 for a UE to perform a hybrid automatic repeat request (HARQ) feedback operation, according to an example implementation of the present disclosure. Although actions 302, 304, and 306 are illustrated as separate actions represented as independent blocks in FIG. 3, these separately illustrated actions should not be construed as necessarily order dependent. The order in which the actions are performed in FIG. 3 is not intended to be construed as a limitation, and any number of the disclosed blocks may be combined in any order to implement the method, or an alternate method. Moreover, each of actions 302, 304, and 306 may be performed independent of other actions and may be omitted in some implementations of the present disclosure.

In action 302, the UE may receive, from a Base Station (BS), a first configuration indicating whether HARQ feedback for a HARQ process is enabled or disabled. The first configuration may be included in a PDSCH-ServingCellConfig Information Element (IE) received from the BS.

In action 304, the UE may receive, from the BS, Downlink Control Information (DCI) on a Physical Downlink Control Channel (PDCCH), the DCI indicating (i) activation or deactivation of semi-persistent scheduling (SPS) and (ii) a Physical Downlink Shared Channel (PDSCH) reception for the HARQ process.

In action 306, the UE may determine, based on a second configuration, and regardless of the HARQ feedback for the HARQ process is enabled or disabled, whether to transmit the HARQ feedback to the BS in response to the PDSCH reception in a case that the second configuration is received from the BS and the DCI indicates the activation of the SPS. The second configuration may indicate whether the HARQ feedback for the activation of the SPS is enabled. The second configuration may be included in a Medium Access Control (MAC)-CellGroupConfig Information Element (IE) received from the BS. The UE may transmit the HARQ feedback to the BS in response to the PDSCH reception in a case that the second configuration indicates that the HARQ feedback for the activation of the SPS is enabled.

In some implementations, the UE may determine, based on the first configuration, whether to transmit the HARQ feedback to the BS in response to the PDSCH reception in a case that the second configuration received from the BS indicates that the HARQ feedback for the activation of the SPS is not enabled and the DCI indicates the activation of the SPS. If the second configuration received from the BS indicates that the HARQ feedback for the activation of the SPS is not enabled and the DCI indicates the activation of the SPS, the UE may transmit the HARQ feedback to the BS in response to the PDSCH reception in a case that the first configuration indicates that the HARQ feedback for the HARQ process is enabled.

In some implementations, the UE may determine, based on the first configuration, whether to transmit the HARQ feedback to the BS in response to the PDSCH reception in a case that the second configuration is not received from the BS and the DCI indicates the activation of the SPS. If the second configuration is not received from the BS and the DCI indicates the activation of the SPS, the UE may transmit the HARQ feedback to the BS in response to the PDSCH reception in a case that the first configuration indicates that the HARQ feedback for the HARQ process is enabled.

In some implementations, the UE may transmit, regardless of the HARQ feedback is enabled or disabled (indicated by the first configuration), the HARQ feedback to the BS in response to the PDSCH reception in a case that the DCI indicates the deactivation of the SPS.

In the present disclosure, the UE may be indicated to transmit the HARQ feedback to the BS in response to the PDSCH reception of DCI for SPS activation/deactivation. Based on a specific configuration configured by the BS, the BS may be aware of whether the DCI for SPS activation/deactivation is received successfully by the UE, thus the reliability may be increased.

Figure 4:
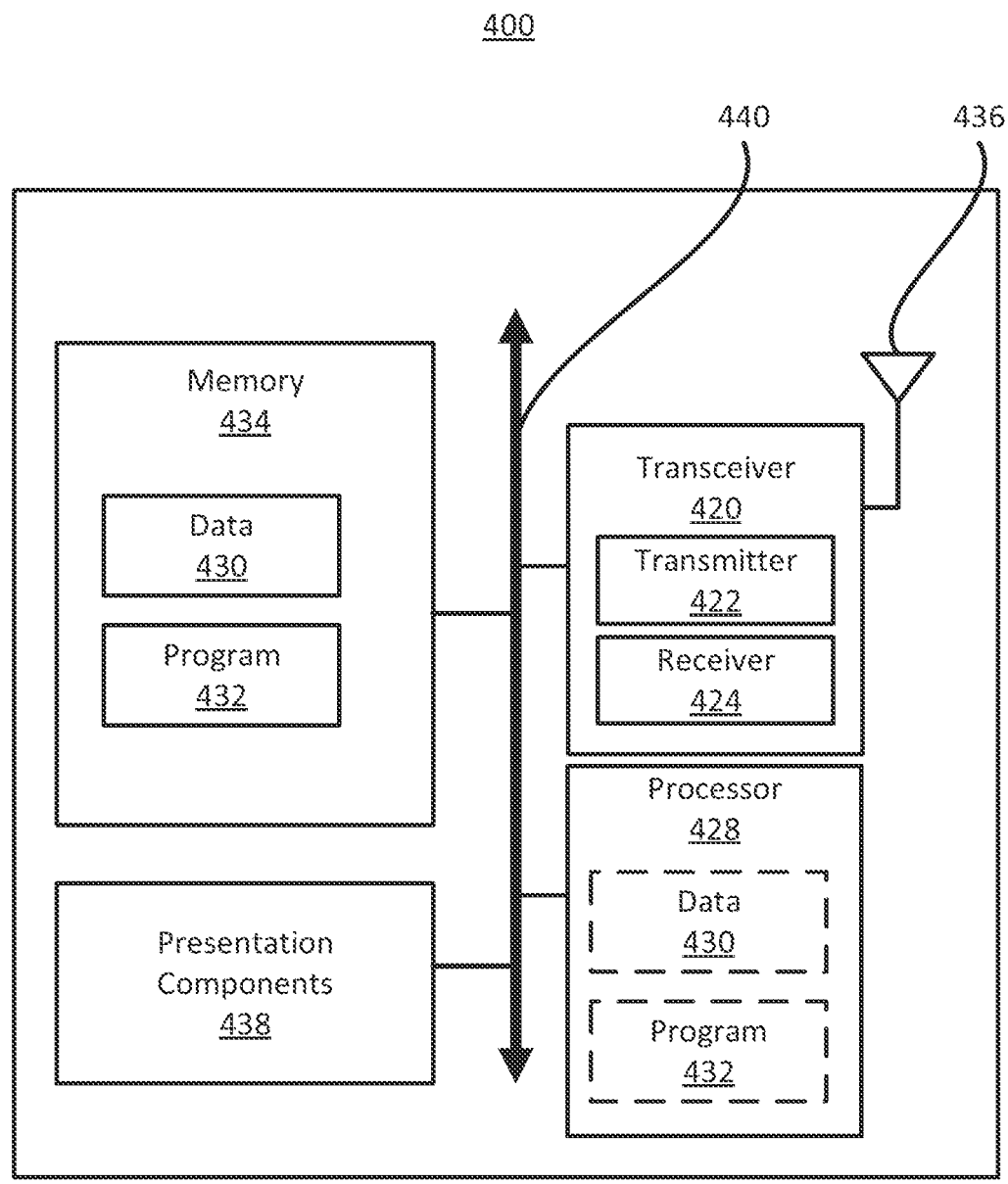
FIG. 4 is a block diagram illustrating a node for wireless communication, according to an example implementation of the present disclosure.

FIG. 4 is a block diagram illustrating a node 400 for wireless communication according to an example implementation of the present disclosure. As illustrated in FIG. 4, a node 400 may include a transceiver 420, a processor 428, a memory 434, one or more presentation components 438, and at least one antenna 436. The node 400 may also include a radio frequency (RF) spectrum band module, a BS communications module, a network communications module, and a system communications management module, Input/Output (I/O) ports, I/O components, and a power supply (not illustrated in FIG. 5).

Each of the components may directly or indirectly communicate with each other over one or more buses 440. The node 400 may be a UE or a BS that performs various functions disclosed with reference to FIG. 3.

The transceiver 420 has a transmitter 422 (e.g., transmitting/transmission circuitry) and a receiver 424 (e.g., receiving/reception circuitry) and may be configured to transmit and/or receive time and/or frequency resource partitioning information. The transceiver 420 may be configured to transmit in different types of subframes and slots including but not limited to usable, non-usable and flexibly usable subframes and slot formats. The transceiver 420 may be configured to receive data and control channels.

The node 400 may include a variety of computer-readable media. Computer-readable media may be any available media that may be accessed by the node 400 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 434 may include computer-storage media in the form of volatile and/or non-volatile memory. The memory 434 may be removable, non-removable, or a combination thereof. Example memory may include solid-state memory, hard drives, optical-disc drives, etc. As illustrated in FIG. 4, the memory 434 may store a computer-readable and/or computer-executable program 432 (e.g., software codes) that are configured to, when executed, cause the processor 428 to perform various functions disclosed herein, for example, with reference to FIG. 3. Alternatively, the program 432 may not be directly executable by the processor 428 but may be configured to cause the node 400 (e.g., when compiled and executed) to perform various functions disclosed herein.

The processor 428 (e.g., having processing circuitry) may include an intelligent hardware device, e.g., a Central Processing Unit (CPU), a microcontroller, an ASIC, etc. The processor 428 may include memory. The processor 428 may process the data 430 and the program 432 received from the memory 434, and information transmitted and received via the transceiver 420, the base band communications module, and/or the network communications module. The processor 428 may also process information to send to the transceiver 420 for transmission via the antenna 436 to the network communications module for transmission to a CN.

One or more presentation components 438 may present data indications to a person or another device. Examples of presentation components 438 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method for a User Equipment (UE) to perform a Hybrid Automatic Repeat Request (HARQ) feedback operation, the method comprising:
receiving, from a Base Station (BS), a first configuration indicating whether HARQ feedback for a HARQ process is enabled or disabled;
receiving, from the BS, Downlink Control Information (DCI) on a Physical Downlink Control Channel (PDCCH), the DCI indicating (i) activation or deactivation of a semi-persistent scheduling (SPS) and (ii) a Physical Downlink Shared Channel (PDSCH) reception for the HARQ process;
determining, based on a second configuration, whether to transmit a HARQ feedback to the BS in response to the PDSCH reception in a case that:
the second configuration is received from the BS,
the first configuration indicates that the HARQ feedback for the HARQ process is disabled, and
the DCI indicates the activation of the SPS; and
determining, based on the first configuration, whether to transmit the HARQ feedback to the BS in response to the PDSCH reception further in a case that the second configuration received from the BS indicates that the HARQ feedback for the activation of the SPS is not enabled and the DCI indicates the activation of the SPS.

2. The method of claim 1, further comprising:
transmitting the HARQ feedback to the BS in response to the PDSCH reception in a case that the second configuration indicates that the HARQ feedback for the activation of the SPS is enabled.

3. The method of claim 1, further comprising:
transmitting the HARQ feedback to the BS in response to the PDSCH reception in a case that the first configuration indicates that the HARQ feedback for the HARQ process is enabled.

4. The method of claim 1, wherein the first configuration is included in a PDSCH-ServingCellConfig Information Element (IE) received from the BS.

5. The method of claim 1, wherein the second configuration is included in a Bandwidth Part (BWP)-DownlinkDedicated Information Element (IE) received from the BS.

6. The method of claim 1, further comprising:
transmitting, regardless of the HARQ feedback being enabled or disabled, the HARQ feedback to the BS in response to the PDSCH reception in a case that the DCI indicates the deactivation of the SPS.

7. A User Equipment (UE) for performing a Hybrid Automatic Repeat Request (HARQ) feedback operation, the UE comprising:
one or more processors; and
at least one non-transitory computer-readable medium coupled to at least one of the one or more processors and storing one or more computer-executable instructions that, when executed by the at least one of the one or more processors, cause the UE to:
receive, from a Base Station (BS), a first configuration indicating whether HARQ feedback for a HARQ process is enabled or disabled;
receive, from the BS, Downlink Control Information (DCI) on a Physical Downlink Control Channel (PDCCH), the DCI indicating (i) activation or deactivation of semi-persistent scheduling (SPS) and (ii) a Physical Downlink Shared Channel (PDSCH) reception for the HARQ process;
determine, based on a second configuration, whether to transmit a HARQ feedback to the BS in response to the PDSCH reception in a case that:
the second configuration is received from the BS,
the first configuration indicates that the HARQ feedback for the HARQ process is disabled, and
the DCI indicates the activation of the SPS; and
determine, based on the first configuration, whether to transmit the HARQ feedback to the BS in response to the PDSCH reception further in a case that the second configuration received from the BS indicates that the HARQ feedback for the activation of the SPS is not enabled and the DCI indicates the activation of the SPS.

8. The UE of claim 7, wherein the one or more computer-executable instructions, when executed by the at least one of the one or more processors, further cause the UE to:
transmit the HARQ feedback to the BS in response to the PDSCH reception in a case that the second configuration indicates that the HARQ feedback for the activation of the SPS is enabled.

9. The UE of claim 7, wherein the one or more computer-executable instructions, when executed by the at least one of the one or more processors, further cause the UE to:
transmit the HARQ feedback to the BS in response to the PDSCH reception in a case that the first configuration indicates that the HARQ feedback for the HARQ process is enabled.

10. The UE of claim 7, wherein the first configuration is included in a PDSCH-ServingCellConfig Information Element (IE) received from the BS.

11. The UE of claim 7, wherein the second configuration is included in a Bandwidth Part (BWP)-DownlinkDedicated Information Element (IE) received from the BS.

12. The UE of claim 7, wherein the one or more computer-executable instructions, when executed by the at least one of the one or more processors, further cause the UE to:
transmit, regardless of the HARQ feedback being enabled or disabled, the HARQ feedback to the BS in response to the PDSCH reception in a case that the DCI indicates the deactivation of the SPS.

* * * * *